(No Model.)
J. ROVANE.
PLANT SUPPORT AND PROTECTOR.
No. 374,906. Patented Dec. 13, 1887.
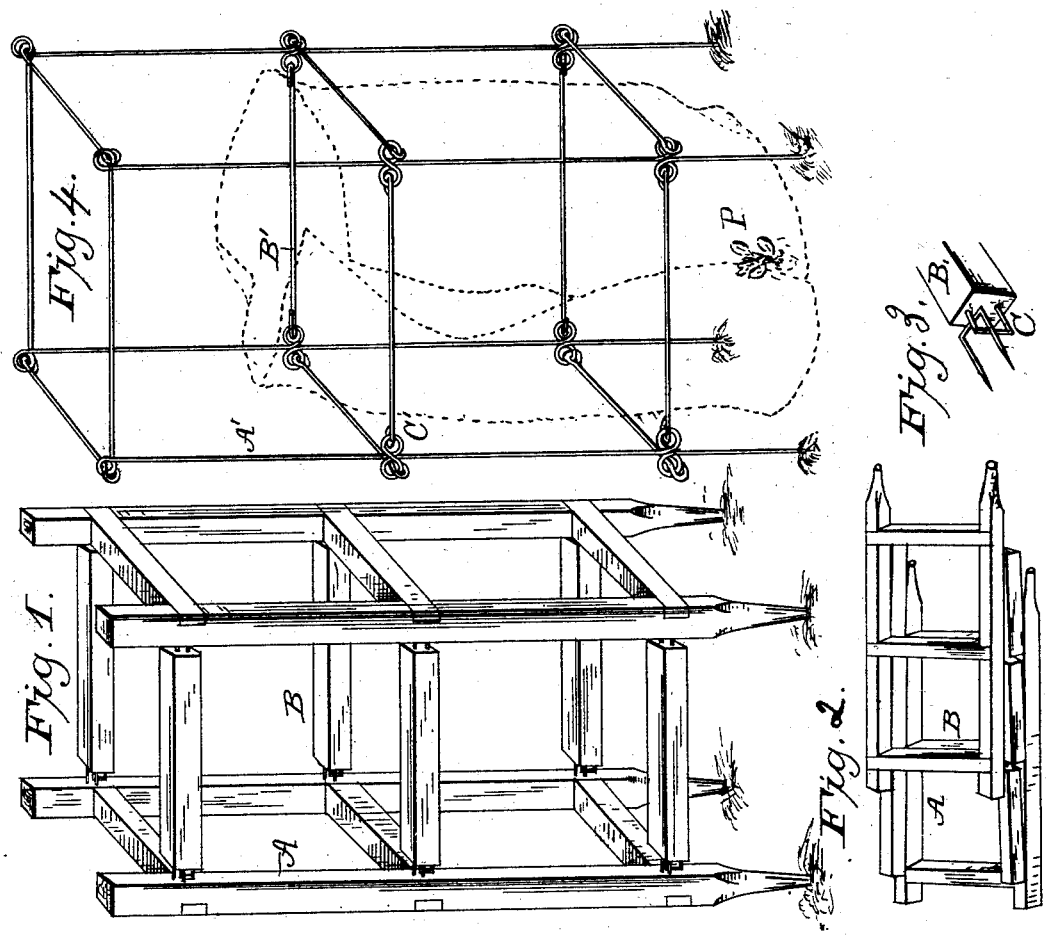
Witnesses:
F. M. Burnham
A. A. Rawlings
Inventor:
John Rovane,
By his Attorney,
Saml. J. Wallace.

UNITED STATES PATENT OFFICE.

JOHN ROVANE, OF KEOKUK, IOWA.

PLANT SUPPORT AND PROTECTOR.

SPECIFICATION forming part of Letters Patent No. 374,906, dated December 13, 1887.

Application filed April 4, 1887. Serial No. 233,609. (No model.)

*To all whom it may concern:*

Be it known that I, JOHN ROVANE, of Keokuk, Lee county, Iowa, a citizen of the United States, have invented a new and useful Improvement in Plant Supporters and Protectors, which is made and used substantially as set forth hereinafter, and as shown in the accompanying drawings, in which—

Figure 1 illustrates in perspective my improved supporter and protector set up. Fig. 2 illustrates the same folded up for storage or shipment. Fig. 3 illustrates a joint in the frame of the same. Fig. 4 illustrates the supporter formed of wire instead of wooden bars.

The object of this invention is to form a cheap and useful device for supporting and also for protecting plants for the use of gardeners, which can be folded up for storage and shipment, and can be rapidly set up around plants to hold paper coverings to protect from sun or frost and afterward left to hold up and support them.

To this end the invention consists in a frame formed of four legs, A, sharpened or adapted to be set firmly into the earth for stability, having cross-bars B at different levels, connecting the legs into an inclosing-frame around a plant, having the legs formed into two flat frames, which are connected by bars on the other sides with flexible connecting-joints, by which they form a collapsible frame adapted to be folded or flattened up for storage or shipment.

The device has four legs, A, formed of wood, as in Figs. 1 and 2, which are sharpened at the lower end for setting into the ground. These legs are held securely at both top and bottom and sometimes intermediately into a frame by cross-bars B, formed of wood, to support the branches of plants without cutting or breaking, so that plants, especially those of a weak nature, will be held up fairly to promote their growth and abundant production of mature fruit or flowers. This is especially designed to support plants like peas, tomatoes, &c., with their heavy products, as well as the lighter flowering plants and trailers. The frame may be the same size at top and bottom, or larger below for stability. The bars at different levels hold the device into a definite stable frame and give support to branches at different levels with much advantage.

The wooden cross-bars B, Figs. 1 and 2, on two sides are set into and nailed or solidly connected to the legs to form two flat frames, and these flat frames are connected by flexible joints formed of staples C, Fig. 3, or their equivalents, to make the device an inclosing and a collapsible frame, and enable it to fold together for storage, shipment, and sale, and to unfold again for use.

The device may in some cases, as for light plants—such as peas and flowering plants—be made of wire, as in Fig. 4. This shows the four legs formed into two flat frames, in a similar manner, by having two legs formed of one wire connecting across the top, and having loops bent in it to receive the several cross-connections, and shows the two frames joined into an inclosing-frame by cross-connections of wire bent to connect by loops in the loops of the legs, so as to be collapsible in the same way as the wooden frame, Fig. 1. Papers may be placed in these frames, whether of wood or wire, as illustrated by dotted lines in Fig. 4, to protect the plants from sun or frost in the spring.

I claim—

1. A collapsible plant-support formed of two frames, each composed of uprights or legs and cross-connections, which frames are attached together into an inclosing-frame by cross-connections on each side having flexible joints, substantially as set forth.

2. A collapsible plant-support formed of four legs, A, having wooden cross-bars B, connecting the legs into an inclosing-frame, said bars being located at different levels, those on two sides being connected to the legs by flexible joints, substantially as set forth.

JOHN ROVANE.

In presence of—
S. W. DAVIS,
E. R. JOHNSTONE.